United States Patent

[11] 3,525,328

| [72] | Inventor | Joseph C. Crudden |
| | | Dallas, Texas |
| [21] | Appl. No. | 745,282 |
| [22] | Filed | July 16, 1968 |
| [45] | Patented | Aug. 25, 1970 |
| [73] | Assignee | Forney Engineering Company |
| | | Dallas, Texas |
| | | a corporation of Texas |

[54] DAMPER FLOATING SIDE RAIL BAR
6 Claims, 6 Drawing Figs.

[52] U.S. Cl. .................................................. 126/285,
137/601, 251/306
[51] Int. Cl. ................................................ F23l 13/00
[50] Field of Search .......................................... 126/285;
98/110; 137/601; 251/214, 306, 308; 277/(Inquired)

[56] References Cited
UNITED STATES PATENTS
3,281,113  10/1966  Ahern .......................... 137/601X
FOREIGN PATENTS
562,152  6/1944  Great Britain ............. 98/110

Primary Examiner— Charles J. Myhre
Attorneys—Constantine A. Michalos, John Maier III and Marvin A. Naigur

ABSTRACT: A damper unit for regulating the flow of hot gases through a duct opening under high ambient temperature conditions. The damper blades are provided with a floating side rail arrangement to allow for lateral growth of the damper blades due to thermal expansion.

Patented Aug. 25, 1970

3,525,328

INVENTOR.
JOSEPH C. CRUDDEN
BY
ATTORNEY

Patented Aug. 25, 1970

INVENTOR.
JOSEPH C. CRUDDEN
BY
ATTORNEY 3,525,328

DAMPER FLOATING SIDE RAIL BAR

BACKGROUND OF THE INVENTION

In the operation of large vapor generator installations, high temperature precision damper units are used to regulate the flow of hot gases. The damper construction which is most usually employed consists of a series of damper blades, each of which is individually mounted on a shaft such that the blades can form a gas-tight barrier across a duct opening when in a closed position. The damper blades are generally formed with an air foil shaped blade arrangement such that the blades can be positioned side by side in the duct opening to form a barrier to the hot gases when in a closed position. The damper blades also lend themselves to adjustment into various intermediate positions to regulate the flow of hot gases through the duct. With this type of aerodynamic blade construction it is possible to bring the lateral adges of adjacent blades together to form a gas tight seal. However, due to high temperature conditions, the damper blades tend to expand and contract along their lateral axis. This can cause leakage of the hot gases as well as binding of the damper shaft in its bearings, such that free rotational movement of the damper is constrained.

In order to prevent gas leakage and obtain free damper blade rotation, when operating under relatively high and varied temperature conditions, one end of the damper shaft is mounted to a floating side rail capable of moving laterally in accordance with the thermal expansion and contraction of the damper blade along its lateral axis. In this manner, complete sealing action against the passage of hot gases is provided when the damper blade is in the closed position, and the damper shaft is capable of rotation in the floating side rail during these periods of expansion and contraction of the damper blade.

SUMMARY OF THE INVENTION

In accordance with an illustrative embodiment demonstrating features and advantages of the present invention, there is provided a damper unit for regulating the flow of hot gases which is capable of operation under high ambient temperature conditions. A frame structure is provided with a central opening and bearing means are spaced apart on the frame in opposing relationship. A shaft is journaled in the bearing means for rotation, and at least one damper blade is mounted on the shaft and laterally extends across the central opening. The damper blade is capable of rotation from an open to a closed position for respectively allowing the passage and sealing of the hot gases. Positioned in the central opening to abut one end of the damper blade is a floating side rail having through bores for receiving the shaft. The side rail is mounted in one of the bearing means for lateral movement in accordance with the thermal expansion of the damper blade. Thus, the side rail extends laterally in the direction of the frame and provides complete sealing against the passage of hot gases when the damper blade is in the closed position.

BRIEF DESCRIPTION OF THE DRAWINGS

The above brief description as well as further objects, features, and advantages of the present invention will be more fully appreciated by reference to the following detailed description of presently preferred but nonetheless illustrative embodiments in accordance with the present invention when taken in connection with the accompanying drawings wherein.

DESCRIPTION OF THE PREFERRED EMBODIMENTS

Figure 6:
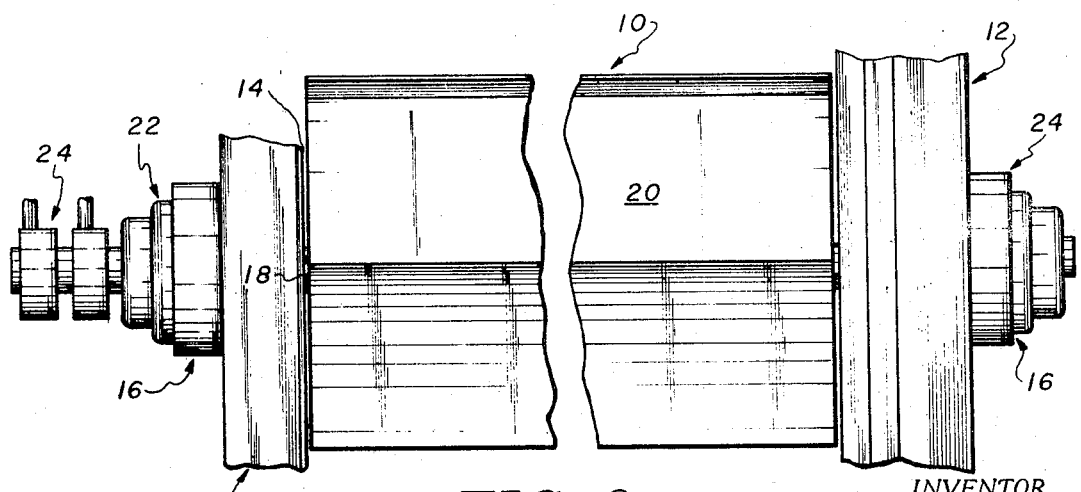
FIG. 6 is an elevational view of the complete bearing structure of the damper unit of the invention, with portions broken away and showing the rigid bearing mounting as well as the lateral movement bearing mounting.

Referring now specifically to the drawings there is shown in FIG. 6 a damper unit construction employing features of the present invention and generally designated by the reference numeral 10. The damper unit 10 includes a frame structure 12 having a central opening 14 with bearing means 16 spaced apart in opposing relationship on frame structure 12. A shaft 18 is journaled in bearing means 16 for rotation, and damper blades 20 are mounted on shaft 18 to extend laterally across central opening 14. The damper blades 20 are capable of being rotated to an open and closed position for respectively allowing the passage and sealing of hot gases.

The bearing means 16 include a stationary bearing 22 and a lateral movement bearing 24. The stationary bearing 22 is provided with a linkage arrangement 24 which is mounted on the end of shaft 18 for conjointly moving the damper blades 20.

Positioned in central opening 14 is a floating spring side rail arrangement, generally designated 30, which abuts the end of damper blade 20. In accordance with the present invention, the floating spring side rail 30 is mounted for lateral movement in accordance with the thermal expansion of damper blades 20, such that the spring side rail 30 extends laterally in the direction of the frame structure 12 and provides complete sealing action against the passage of hot gases when damper blades 20 are in the closed position.

Figure 1:
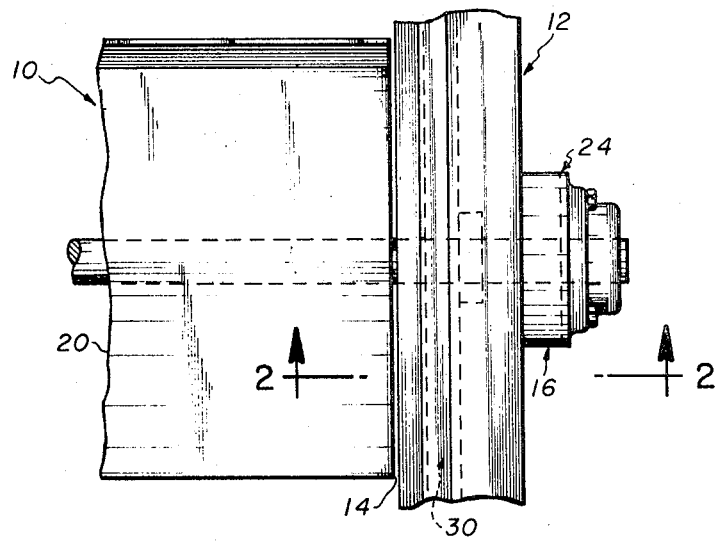
FIG. 1 is an elevational view of a portion of a high temperature damper unit of the instant invention which is shown completely removed from the duct arrangement.
Figure 2:
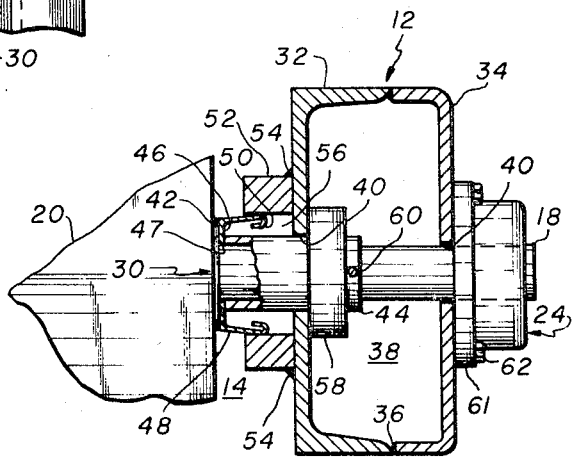
FIG. 2 is an enlarged sectional view of the damper unit which is shown in FIG. 1, taken along the line 2–2 and looking in the direction of the arrows, in order to clearly show the floating side rail arrangement prior to lateral expansion thereof.

As shown in FIG. 2 the frame structure 12 includes a vertical upstanding support 32 and a cover plate support 34 which are joined together by means of welds 36 to form a hollow chamber 38. The supports 32 and 34 are provided with aligned bores 40 for receiving the shafts 18.

The spring side rail 30 includes a spring seal 42 mounted on a cylindrical collar 44. The spring seal 42 is integrally formed with a shoulder 46 having through bores 47 and a pair of upright side walls 48 having curled outer lips 50. A pair of stationary seal bars 52 are mounted to the outer face of the upstanding support 32 by means of butt welds 54 to form a sealing channel 56. The spring seal 42 is fabricated from resilient metal such that the upright bars 48 bear against the sides of seal bars 52 in sealing channel 56. In this manner, a gas-tight seal is provided between each of the upright side walls 48 and the respective adjacent sealing bars 52.

Mounted on upstanding support 32 is a stuffing box 58 which is packed with a heavy lubricant and has an axial bore which is aligned with through bore 40 for rotatably receiving shaft 18. The cylindrical collar 44 is mounted on shaft 18 by means of a lock screw arrangement 60. The lateral movement bearing arrangement 24 is mounted on the outer face of cover plate support 34 by means of flanged plate 61 and bolts 62.

Figure 3:
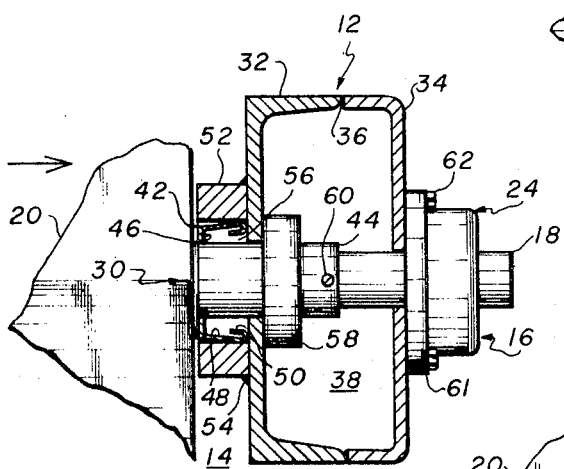
FIG. 3 is an enlarged sectional view similar to FIG. 2 but showing the damper blade after maximum thermal expansion along the lateral axis has taken place.

By progressively inspecting FIGS. 2 and 3, it can be appreciated that thermal expansion causes lateral growth to the damper blades 20 and shafts 18. Thus, FIG. 2 shows a damper blade 20 prior to the occurrence of thermal expansion and the attendant lateral growth, with the spring side rail 30 located in its outermost extended position in the sealing channel 56. In FIG. 3 the damper blade 20 is shown after maximum lateral growth, and the spring side rail 30 is located in its innermost extended position in sealing channel 56, with outer lip 52 abutting the outer face of upstanding support 32. In accordance with the present invention, the spring seal 42, cylindrical collar 44, and the outboard end of shaft 18 grow laterally due to thermal expansion. This can be readily appreciated by referring to the movement of spring seal 42 in sealing chamber 56, as well as the expansion of the outer portion of shaft 18 which extend beyond the outboard face of lateral movement bearing 24, as shown in FIGS. 2 and 3 respectively.

Figure 4:
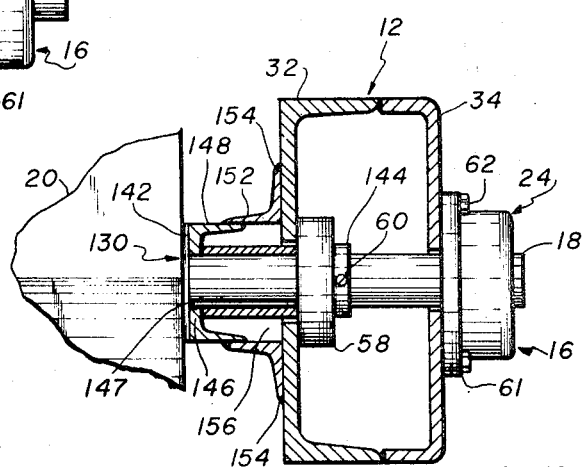
FIG. 4 is an enlarged sectional view similar to FIG. 2 but showing another embodiment of the floating side rail in which a rigid member is employed.

In FIG. 4 there is illustrated a further embodiment of the invention in which corresponding parts have been designated by the same reference numerals as part of a 100 series. In this form of the invention, a floating rigid side rail 130 is mounted for lateral movement in accordance with the thermal expansion of the damper blades 20, such that the rigid side rail 130 extends laterally in the direction of frame structure 12 and provides complete sealing action against the passage of high temperature gases when damper blades 20 are in the closed position.

The rigid side rail 130 includes a rigid seal 142 mounted on a cylindrical collar 144. The rigid seal 142 is integrally formed with the shoulder 146 having through bores 147 and upright side walls 148. A pair of sealing angle bars 152 are mounted to the outer face of the upstanding support 32 by means of welds 156 to form a sealing channel 156. The rigid seal 142 is fabricated from steel stock such that the upright side walls 148 bear against the sides of angle bars 152 in sealing channel 156. In this manner, a gas tight seal is provided between each of the upright side walls 148 and the respective adjacent angle bars 152.

In FIG. 4 the damper blade 20 is shown prior to the occurrence of thermal expansion and the attendant lateral growth, with the rigid side rail 130 located at its outermost extended position in sealing channel 156. After maximum thermal expansion and lateral growth, the rigid side rail 130 would be located in its innermost extended position in sealing channel 156, in a manner substantially as has been shown for the first embodiment of the invention in FIG. 3.

Figure 5:
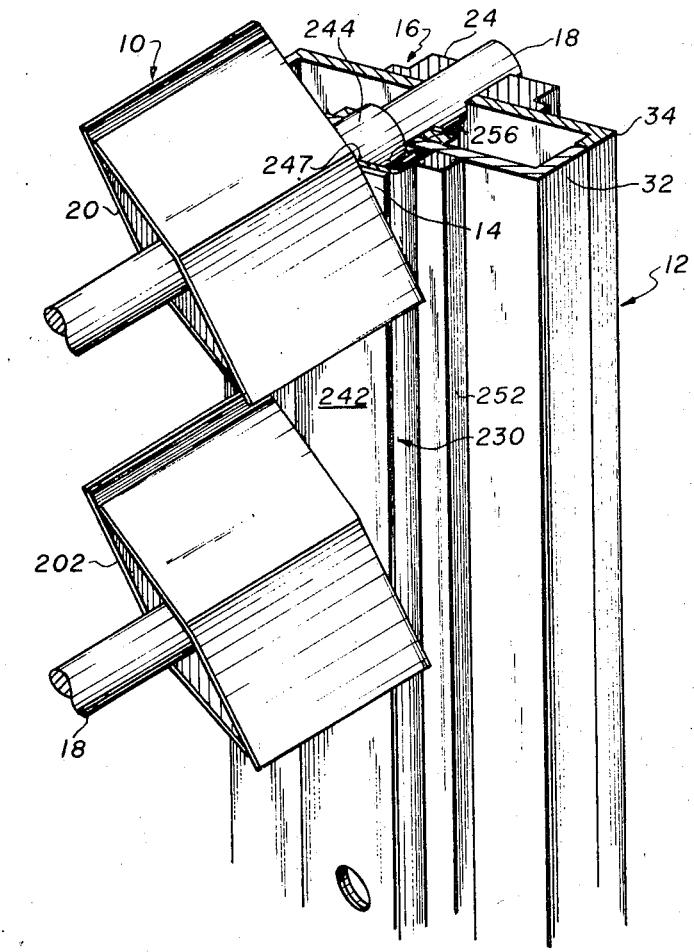
FIG. 5 is an enlarged perspective view of a still further embodiment of the present invention in which the upper portion is broken away and sectioned in order to more clearly show the floating side rail arrangement of this embodiment.

In FIG. 5, there is illustrated a still further embodiment of the invention wherein corresponding parts have been designated by the same reference numerals as part of a 200 series. In this form of the invention, a floating bar side rail 230 is positioned in central opening 14 and abuts the end of damper blade 20. The floating bar side rail 230 is mounted for lateral movement in accordance with the thermal expansion of the damper blade 20 such that the bar side rail 230 extends laterally in the direction of the frame structure 12 and provides complete sealing action against the passage of hot gases when damper blade 20 is in the closed position.

The bar side rail 230 includes a solid bar seal 242 mounted on a cylindrical collar 244. The solid bar seal 242 is formed with through bores 247 for receiving the shafts 18. A pair of guide bars 252 are mounted on the outer face of upstanding support 32 to form a sealing channel 256. The bar seal 242 is fabricated from steel stock, such that the outer side walls bear against the inner side walls of the bars 252 in sealing channel 256. In this manner, a gas tight seal is provided between the side walls of bar seal 242 and the respective adjacent guide bars 252.

From the foregoing, it can be appreciated that in accordance with the present invention there has been provided several embodiments of floating side rail arrangements for use in damper unit 10, such as the floating spring side rail 30, the floating rigid side rail 130 and the floating bar side rail 230. By allowing for lateral growth due to thermal expansion, the damper unit 10 in accordance with the present invention affords a gas tight seal against the flow of hot gases without impairing the free rotation of the damper blades 20.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:
1. A damper unit for regulating the flow of hot gases and capable of operation under high ambient temperature conditions comprising a frame structure having a central opening, bearing means spaced apart on said frame in opposing relationship, a shaft journaled in said bearing means for rotation, at least one damper blade mounted on said shaft and laterally extending across said central opening, said damper blade capable of being rotated to an open and closed position for respectively allowing the passage and sealing of said hot gases, at least one pair of upstanding sealing bars mounted on said frame to define a sealing channel which is vertically oriented with respect to the horizontal axis of said shaft, and at least one floating side rail positioned in said central opening to abut one end of said damper blade and formed with through bores for receiving and securing said shaft, said side rail being mounted for lateral movement in accordance with the thermal expansion of said damper blade and shaft such that said side rail extends laterally in the direction of said frame and provides complete sealing action against the passage of hot gases when said damper blade is in said closed position.

2. A damper unit according to claim 1, in which said floating side rail comprises a seal including a shoulder having through bores for receiving said shaft, and a pair of upright side walls integrally formed with said shoulder, said side walls formed from resilient material such that side walls bear against sealing bars.

3. A damper unit according to claim 1, in which said floating side rail comprises a solid bar formed with through bores for receiving said shaft and said bar is sized for free sliding movement in said sealing channel.

4. A damper unit for regulating the flow of hot gases and capable of operation under high ambient temperature conditions comprising a frame structure having a central opening, bearing means spaced apart on said frame in opposing relationship, a shaft journaled in said bearing means for rotation, at least one damper blade mounted on said shaft and laterally extending across said central opening, said damper blade capable of being rotated to an open and closed position for respectively allowing the passage and sealing of said hot gases, a floating side rail positioned in said central opening to abut one end of the damper blade and formed with through bores for receiving the shaft, a pair of upstanding sealing bars mounted on said frame to define a sealing channel, said side rail being mounted in said sealing channel for lateral sliding movement, a cylindrical collar fixed to said side rail and coaxially mounted on said shaft, whereby said side rail and said shaft extend laterally under thermal expansion.

5. A damper unit according to claim 4, in which said floating side rail comprises a seal including a shoulder having through bores for receiving said shaft, and a pair of upright side walls integrally formed with said shoulder, said side walls formed from resilient material such that said side walls bear against said sealing bars.

6. A damper unit according to claim 4, in which said floating side rail comprises a solid bar formed with through bores for receiving said shaft and said bar is sized for free sliding movement in said sealing channel.